US012782129B2

(12) United States Patent
Moren

(10) Patent No.: US 12,782,129 B2
(45) Date of Patent: Nov. 3, 2026

(54) LASER LEVELING DEVICE

(71) Applicant: Robert Bosch GmbH, Stuttgart (DE)

(72) Inventor: Gaetan Moren, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 376 days.

(21) Appl. No.: 18/540,479

(22) Filed: Dec. 14, 2023

(65) Prior Publication Data

US 2024/0210172 A1 Jun. 27, 2024

(30) Foreign Application Priority Data

Dec. 22, 2022 (DE) ..................... 10 2022 214 292.6

(51) Int. Cl.
*G01C 15/00* (2006.01)

(52) U.S. Cl.
CPC .................................. *G01C 15/004* (2013.01)

(58) Field of Classification Search
CPC .................................................... G01C 15/004
See application file for complete search history.

(56) References Cited

U.S. PATENT DOCUMENTS 5,819,424 A * 10/1998 Ohtomo ............... G01C 15/105 33/290
6,073,353 A * 6/2000 Ohtomo ............... G01C 15/004 33/290
9,441,963 B2 * 9/2016 Yuen .................... G01C 15/004
9,846,034 B2 * 12/2017 Hill ...................... G01C 15/004
10,240,949 B2 * 3/2019 Peters .................. G01C 15/004
11,714,253 B2 * 8/2023 Oguchi .............. B23K 26/0648 359/822
12,152,882 B2 * 11/2024 Gould .................. G01C 15/006
12,392,608 B2 * 8/2025 Gould .................. G01C 15/004
2007/0000139 A1 * 1/2007 Chen .................... G01C 15/004 33/286
2009/0100691 A1 * 4/2009 Lu ........................ G01C 15/004 33/285
2012/0090184 A1 * 4/2012 Zimmermann ...... G01C 15/004 33/291
2015/0204666 A1 * 7/2015 Hill ...................... G01C 15/004 33/290
2022/0170744 A1 * 6/2022 Gould .................. G01C 15/006
2023/0045402 A1 * 2/2023 Pohlmann ............ G01C 15/008
2023/0204356 A1 * 6/2023 Gould .................. G01C 15/004 33/299
2024/0039238 A1 * 2/2024 Sergyeyenko ...... H01S 5/02469
2024/0183660 A1 * 6/2024 Lee ...................... G01C 15/004
2024/0210172 A1 * 6/2024 Moren ................. G01C 15/004
2024/0410694 A1 * 12/2024 Sergyeyenko ....... G01C 15/004
(Continued)

FOREIGN PATENT DOCUMENTS

CN 212482477 U 2/2021
CN 215893619 U 2/2022
DE 299 14 639 U1 1/2000
(Continued)

*Primary Examiner* — Yaritza Guadalupe-McCall
(74) *Attorney, Agent, or Firm* — Maginot, Moore & Beck LLP

(57) ABSTRACT

A laser leveling device has at least two line projection devices a housing that includes at least two outlet domes for each of the line projection devices, and an operating unit for operating the laser leveling device. The operating unit is arranged between the outlet domes.

7 Claims, 3 Drawing Sheets

(56) References Cited

U.S. PATENT DOCUMENTS

2025/0113463 A1* 4/2025 Sergyeyenko ....... G01C 15/004

FOREIGN PATENT DOCUMENTS

| | | | | |
|---|---|---|---|---|
| DE | 10 2016 225 242 A1 | | 6/2018 | |
| DE | 202025104054 U1 | * | 7/2025 | ........... G01C 15/004 |
| EP | 2 411 762 B1 | | 11/2016 | |
| EP | 4534955 A1 | * | 4/2025 | ........... G01C 15/004 |
| WO | 2011/098608 A1 | | 8/2011 | |
| WO | 2018/009193 A1 | | 1/2018 | |

* cited by examiner

LASER LEVELING DEVICE

This application claims priority under 35 U.S.C. § 119 to patent application number DE 10 2022 214 292.6, filed on Dec. 22, 2022 in Germany, the disclosure of which is incorporated herein by reference in its entirety.

The present disclosure relates to a laser leveling device.

BACKGROUND

A laser leveling device with line projection devices is known from DE 10 2016 225 242 A1.

In EP 2411762 A1, a laser leveling device for generating an optical leveling signal is known, comprising a laser module for generating a leveling signal that can be arranged in a housing in a pendulum-like manner.

SUMMARY

The present disclosure proceeds from a laser leveling device having at least two line projection devices, having a housing, wherein the housing comprises at least two outlet domes for each of the line projection devices and having an operating unit for operating the laser leveling device. It is proposed that the operating unit is arranged between the outlet domes.

The disclosed laser leveling device thereby increases user-friendliness, as the operating unit is arranged on the housing of the laser leveling device so that a user can intuitively operate the laser leveling device. The arrangement of the operating unit allows the user to immediately recognize what the operating unit is configured for without having to find out what the operating unit is configured for by multiple testing.

For example, the laser leveling device may be configured as a line laser, a cross-line laser, or a self-leveling multi-line laser device. "Laser leveling devices" are used to generate optical markings, in particular laser markings, in the context of leveling, aligning, surveying, and/or marking tasks, such as those that occur in particular in the skilled trade sector, for example, in the interior construction of buildings, during construction work, when applying markings on walls, or the like. In principle, laser leveling devices allow laser markings to be generated, in particular to project on objects that represent an independent reference to an orientation of floors, ceilings, walls or other objects, for example the vertical wall of a cabinet, in particular but also to the orientation of the housing of the laser leveling device. In principle, laser leveling devices in at least one operating state allow a laser marking aligned with the gravitational field, i.e., a laser marking aligned with the direction of gravity or relative to the perpendicular, to be generated as a reference. In particular, the generated laser marking may be aligned, for example horizontally and/or vertically and/or at a different defined angle to the perpendicular relative to the laser leveling device.

The line projection device includes a reflective cone and a laser beam which can be directed in the direction of a cone axis of this reflective cone towards the tip of this cone. Here, at least two line projection devices are provided, which are arranged at an angle to each other in the housing. For example, the line projection devices may be arranged perpendicular to each other. The laser leveling device may comprise at least one laser module for generating the laser beam. The laser module comprises at least one light source for generating a laser marking on an object, in particular a laser, a semiconductor laser, typically a laser diode. The laser module may comprise at least one beam splitter provided to generate a projectable laser line from the laser light emitted by the laser diode, in particular a laser line projectable over a 360° angular range. Furthermore, the laser module may have further beam-forming and/or beam-deflecting and/or optical elements affecting the properties of the laser light, for example, lenses, filters, diffractive elements, mirrors, reflectors, optically transparent discs, or the like. Reflective cones in particular may be used to fan out the laser light emitted from the light source in a laser plane in a technically simple manner, such that when this laser plane is projected onto an object, a line is created, in particular a marking line, preferably a laser line that can be projected over a 360° angular range.

The exact configuration, in particular shape and color, of the laser marking generated by the laser leveling device, in particular by means of the laser module, can be different depending on the area of application and task, among other things. For example, the angular range in which the laser light is emitted in the form of a laser plane ("laser fan") may also deviate from 360° and, for example, only cover a 270° or 180° angular range. Furthermore, the laser plane may also be interrupted over the angular range, for example due to shades or the like, in particular from parts of the housing of the laser leveling device.

Furthermore, the laser leveling device can also have a plurality of, in particular two or three, laser modules, each of which is received on an optical carrier, in particular a pendulum arrangement, so that, when the optical carrier, in particular the pendulum arrangement, is aligned to the perpendicular, a plurality of laser modules and thus also their generated laser planes are aligned simultaneously in relation to the perpendicular and can serve as a reference. In one embodiment, the laser leveling device may also have two or three laser modules that emit orthogonal laser planes to each other, the projection of which onto objects generates marking lines orthogonal to each other. In this case, a vertically aligned laser plane may have a direction along the direction specified by the perpendicular, i.e., the vertically aligned laser plane is collinear with a vector describing the force of gravity.

The optical carrier, in particular the pendulum arrangement, is arranged in the housing. The optical carrier, in particular the pendulum arrangement, in particular an enclosed pendulum of the pendulum arrangement, is provided for holding and aligning the laser module, wherein the laser module is configured to be freely self-aligning, in particular oscillating or oscillating on all sides, by means of the pendulum of the pendulum arrangement, essentially independently of an alignment of the housing to the perpendicular. The laser module, when operated, serves to generate at least one laser marking on an object.

The laser beam generated by means of the laser module may serve as an optical axis. Depending on a number of laser beams and/or line projection device, a plurality of optical axes may be provided.

The housing comprises a power supply unit configured at least to supply power to the laser module. The power supply unit is provided for cordless operation by means of rechargeable batteries, in particular hand-held power tool rechargeable battery packs, and/or for mains operation. In a preferred embodiment, the power supply unit is designed for cordless operation. In the context of the present disclosure, a "hand-held power tool rechargeable battery pack" is intended to be understood as a combination of at least one rechargeable battery cell and a rechargeable battery pack housing. The hand-held power tool rechargeable battery pack is advantageously designed for supplying power to commonly available cordless hand-held power tools. The at least one rechargeable battery cell can, for instance, be designed as a Li-ion rechargeable battery cell having a nominal voltage of 3.6 V. The hand-held power tool rechargeable battery pack can comprise up to ten rechargeable battery cells, for example, wherein a different number of rechargeable battery cells also is conceivable. Both an embodiment as a cordless laser leveling device and operation as a mains-operated laser leveling device are sufficiently well-known to those skilled in the art, so the specifics of the power supply will not be discussed here.

The housing comprises at least two outlet domes each associated with a line projection device. The line projection device may be immersed in the outlet domes, such that the generated laser plane may exit through the outlet domes. The outlet domes each protrude out of the housing. The outlet domes may each be connected to the housing. In this case, the output domes may be connected to the housing, for example by means of a screw connection, a latch connection, a hook connection or by means of screws. For example, the outlet domes may be cubic, cuboid, curved, shaped like a half shell, like a truncated cone or like a truncated pyramid. It is possible that the outlet domes have windows for the respective laser beam, in particular the respective laser plane. Furthermore, the outlet domes may each have webs between a window of one of the outlet domes. In addition, the outlet domes may each have a flat cover.

The operating unit is arranged on the housing. The operating unit is used to operate the laser leveling device. The operating unit may control at least one function of the laser leveling device, in particular activate and/or deactivate it, for example activate at least one of the laser modules, activate a communication link or activate a lighting unit. The operating unit is arranged between the outlet domes, such that the operating unit is at least partially enclosed or encompassed by the outlet domes. This allows a function stored on the operating unit to be intuitively activated for the user.

In an embodiment of the laser leveling device, each of the outlet domes has a surface normal and the operating unit is arranged on the housing relative to a plane spanned by two surface normals of the outlet domes. The surface normal is understood here to be a vector that is arranged perpendicular on a surface. Each outlet dome has one of the surface normals, wherein the surface normal is perpendicular to the respective outlet dome. For example, the surface normal is perpendicular on the flat cover of the outlet dome. The surface normals of the two outlet domes span one plane. An origin of this plane may be within the housing. Depending on the embodiment, the origin of the plane may match an origin of the optical axes of the laser beams. The surface normals of the outlet domes may be at least partially collinear or coaxial with the respective optical axes of the laser modules. In an operation of the laser leveling device, in particular in an operation on an inclined plane, the surface normals of the outlet domes and the respective optical axis may be at least partially at an angle to each other. This may be the case if the optical carrier oscillates or is arranged on an inclined surface. The operating unit is arranged relative to the plane on the housing, which spans the two surface normals. The arrangement of the operating unit relative to the plane of the two surface normals of the outlet domes may be transverse, in particular perpendicular, angled or parallel.

In one embodiment of the laser leveling device, the operating unit comprises at least one operating element arranged between the outlet domes. The operating element is used to operate the laser leveling device. The operating unit may have a plurality of operating elements, for example two operating elements for activating a communication link using Bluetooth and for activating lighting. Up to three additional operating elements are also possible for each of the laser modules. Each operating element may each have an operating surface. For example, the operating elements may be flat, curved, dome-shaped, cuboid, rectangular, or protruding. The operating surfaces may, for example, be polygonal, such as triangular, square, pentagonal, or hexagonal, square, rectangular, round, oval, elliptical, or the like.

In one embodiment of the laser leveling device, the operating element has a surface normal, wherein the surface normal of the operating element is arranged relative to the plane spanned by the two surface normals of the outlet domes. Essentially each of the operating elements has a surface normal. The surface normal of the operating element is arranged perpendicularly on the operating element, in particular on the associated operating surface. The surface normal of the operating element may be arranged in the plane spanned by the two surface normals of the outlet domes, transverse to the plane or perpendicular to the plane.

In one embodiment of the laser leveling device, the housing comprises at least one separating surface arranged at least in sections between the outlet domes. The housing may comprise a plurality of separating surfaces. A number of separating surfaces may be correlated to a number of outlet domes. The separating surface may be a part, an element or an area of the housing. For example, the separating surface may be formed planar, flat, angular or curved. In addition, the separating surface may be connected to the housing or may be integral with the housing. The separating surface may, for example, be polygonal, such as triangular, square, pentagonal, or hexagonal, square, rectangular, round, oval, elliptical, or the like. Up to three outlet domes may be provided, wherein one separating surface may be provided between each of two outlet domes. With two output domes, at least one separating surface may be arranged. With three outlet domes, up to three separating surfaces may each be arranged between two of the outlet domes. A length of the separating surface may substantially match a length of the respective outlet dome. Thus, the separating surface may separate at least two of the outlet domes. The separating surface may be arranged at an angle to the outlet domes.

In one embodiment of the laser leveling device, the separating surface has a surface normal that lies on the plane spanned by the surface normal of the outlet domes. The surface normal of the separating surface is perpendicular to the separating surface. The surface normal of the separating surface lies substantially entirely on the plane spanned by the surface normals of the outlet domes. The surface normals of the separating surface is thus in the plane spanned by the two surface normals of the outlet domes. Upon an extension of the surface normal of the separating surface, a vector of the surface normal of the separating surface may coincide with the origin of the plane spanned by the surface normal of the outlet domes.

In one embodiment of the laser leveling device, the operating element is arranged on the separating surface. A plurality of operating elements may be arranged on the separating surface, for example two. The operating element may be connected to the separating surface in a form-fit, force-fit, and/or material-fit manner. It is possible that the separating surface and the operating element are integral. It is also conceivable that the separating surface forms the operating element.

In one embodiment of the laser leveling device, the laser leveling device comprises three line projection devices and three outlet domes, wherein the operating unit is at least partially arranged between the three outlet domes. For example, the three outlet domes may be arranged in a triangle with respect to each other. The operating unit may be arranged within this triangle on the housing. The operating unit can thus be arranged on the housing between the three outlet domes.

In one embodiment of the laser leveling device, the three output domes each have a surface normal and the operating unit has at least one operating surface, wherein the operating surface is arranged at least partially on a plane spanned by the three surface normals. The surface normals are each perpendicular on the associated outlet dome. One point each on the respective surface normals of the outlet domes span the plane, such that the plane is arranged between the three surface normals. Thus, three points span the plane between the surface normals of the outlet domes. The spanned plane of the three surface normals may be triangular, wherein the triangle may be isosceles or equilateral, for example. For example, the operating surface may be level, planar, curved, dome-shaped, cuboid or cubic. In addition, the operating surface may be polygonal, such as triangular, square, pentagonal, or hexagonal, round, oval or elliptical. The operating surface is arranged between the three outlet domes. The operating interface may abut three separating surfaces.

In one embodiment of the laser leveling device, the operating unit comprises three operating elements each associated with a line projection device. For example, the operating elements may be planar, flat, curved, dome-shaped, rectangular or cubic. Each of the three operating elements also has an operating surface, which can be configured in a polygonal manner, for example, triangular, square, pentagonal or hexagonal, round, oval or elliptical. Each of the three operating elements activates one of the laser modules of the line projection devices. As a result, one of the laser modules can be activated successively and as needed. The arrangement of the three operating elements between the three outlet domes is such that the user can directly recognize which of the line projection devices is activated by means of the respective operating element when the user actuates the corresponding operating element. This means that the user intuitively knows which of the operating elements is provided for which of the line projection devices. Each of the operating elements has a surface normal. An assignment of the three operating elements and the respective line projection device may be by a minimum distance of the surface normal of the respective operating element to the surface normal of the corresponding outlet dome. That operating element activates the corresponding line projection device to which the distance is minimal. Furthermore, the one of the three operating elements that points in the direction of the respective outlet dome and/or in the direction of the respective line projection device activates the associated line projection device. Whichever of the three operating elements is arranged closest to one of the three line projection devices on the housing operates the corresponding line projection device.

In one embodiment, at least two of the three operating elements abut one of the separating surfaces. If three separating surfaces are provided, two of the three separating surfaces may each abut one of the three separating surfaces. The three separating surfaces may be arranged in a radial manner around the three operating elements on the housing.

BRIEF DESCRIPTION OF THE DRAWINGS

The disclosure is explained in more detail in the following with reference to a preferred embodiment. In the following, the drawings show.

DETAILED DESCRIPTION

Figure 1:
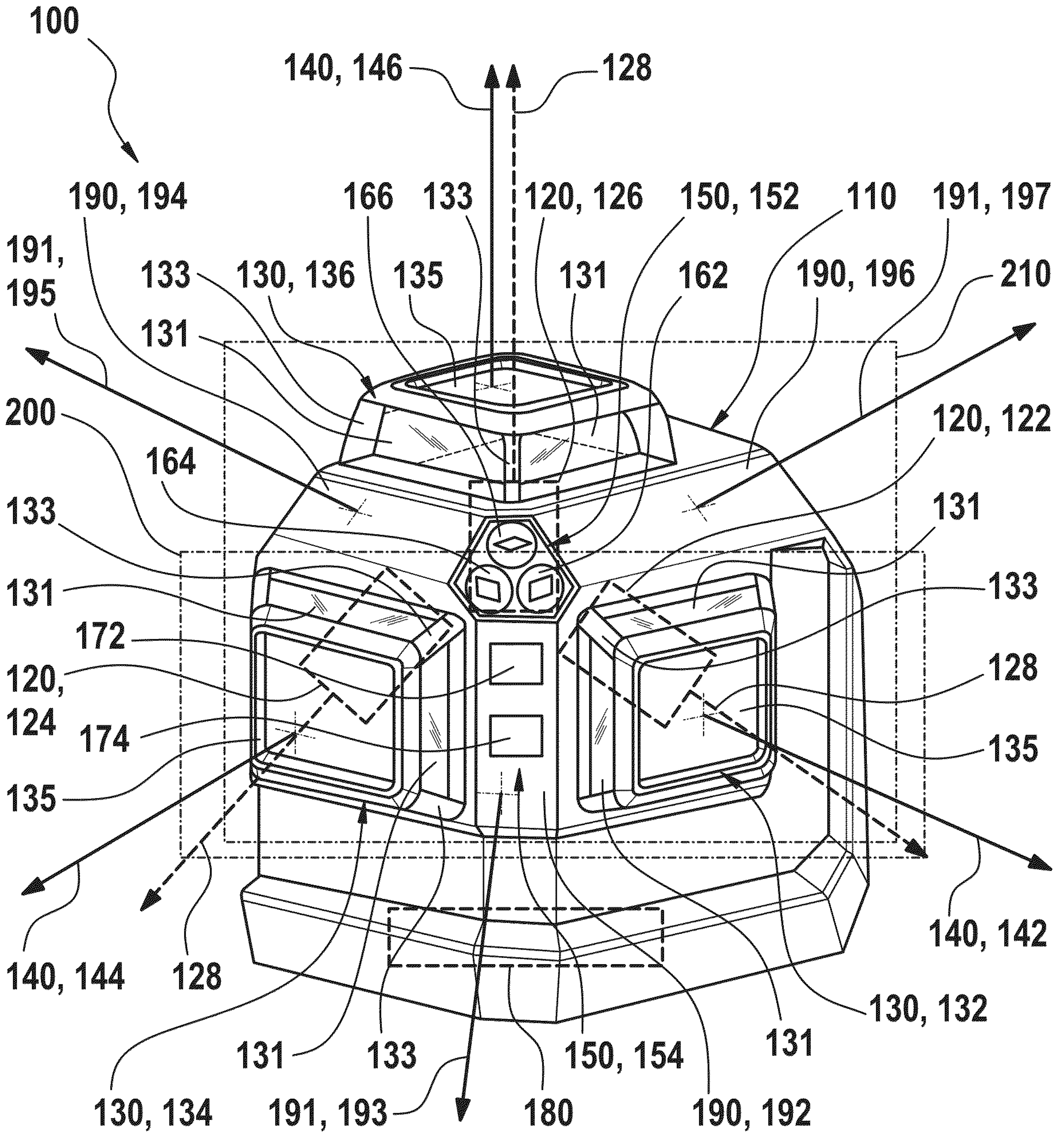
FIG. 1 a schematic view of a laser leveling device according to the disclosure.

FIG. 1 shows a schematic view of a laser leveling device 100 according to the present disclosure, which is configured herein as a cross-line laser, as an example. The laser leveling device 100 has a housing 110, three line projection devices 120 (not shown in detail), and three outlet domes 130. In the line projection devices 120, a first line projection device 122, a second line projection device 124, and a third line projection device 126 are provided. In the three outlet domes 130, a first outlet dome 132, a second outlet dome 134 and a third outlet dome 136 are provided. However, it should be noted here that both the three line projection devices 120 and the three outlet domes 130 are each substantially equivalent and numbering here is merely exemplary.

Each line projection device 120 has a reflective cone and a laser beam 122 (not shown in detail here). The laser beam 128 can be directed in the direction of a cone axis of the respective reflective cone towards the tip of this cone. The respective laser beam 128, before it hits the respective cone, forms an optical axis. The three line projection devices 120 are arranged here at an angle, particularly perpendicular, to each other in the housing 110. By way of example, each line projection device 120 here has a laser module (not shown in detail) to generate one of the laser beams 128. Here, each line projection device 120 projects into each of the outlet domes 130.

The outlet domes 130 are, by way of example, each bolted to the housing 110. The outlet domes 130 are, by way of example, each configured in the form of a truncated pyramid. The outlet domes 130 each comprise a plurality of windows 131 for the respective laser beam 128. The windows 131 are each separated by webs 133 of the outlet dome 130. Each outlet dome 130 has, by way of example, a flat cover 135.

In addition, the laser leveling device 100 comprises an operating unit 150 arranged between the outlet domes 130 on the housing 110. The laser leveling device 100 can be operated at least by means of the operating unit 150. For example, a first operating unit 152 for operating the line projection device 120 and a second operating unit 154 for operating further functions of the laser leveling device 100 are provided here, see also FIGS. 2 and 3. The first operating unit 152 has three operating elements 162, 164, 166, see also FIG. 3. The second operating unit 154 has two operating elements 172, 174, see also FIG. 2. The operating unit 150 is arranged between the outlet domes 130. Here, the first operating unit 152 is arranged between the first outlet dome 132, the second outlet dome 134, and the third outlet dome 136, see also FIG. 3. The second operating unit 154 is arranged, by way of example, between the first outlet dome 132 and the second outlet dome 134.

The housing 110 comprises a power supply unit 180. The power supply unit 180 supplies power to at least the laser modules. The power supply unit 180 is not shown in detail herein.

Each of the outlet domes 130 has a surface normal 140. The first outlet dome 132 has a first surface normal 142, the second outlet dome 134 has a second surface normal 144, and the third outlet dome 136 has a third surface normal 146, see also FIGS. 2 and 3. The operating unit 150 is arranged relative to a plane 156, 158 spanned by two of the surface normals 140 of the outlet domes 130 on the housing 110, see also FIGS. 2 and 3. The surface normal 140 is in each case perpendicular to one of the outlet domes 130, in particular to the respective cover 135. Thus, the first surface normal 142 of the first outlet dome 132 is perpendicular to the first outlet dome 132. The second surface normal 144 of the second outlet dome 134 is perpendicular to the second outlet dome 134. The third surface normal 146 of the third outlet dome 136 is perpendicular to the third outlet dome 136.

The housing 110 has at least one separating surface 190. The housing 110 comprises a first separating surface 192 arranged between the first outlet dome 132 and the second outlet dome 134. A second separating surface 194 is arranged between the second outlet dome 134 and the third outlet dome 136. A third separating surface 196 is arranged between the third outlet dome 136 and the first outlet dome 132. The separating surfaces 190 are formed here, by way of example, flat with a rectangular outer contour. The separating surfaces 190 are configured, by way of example, at an angle to the respective outlet dome 130 on the housing 110. The housing 110 here forms, by way of example, the separating surfaces 190 so that they are integral. Each of the separating surfaces 190 has a surface normal 191. Thus the first separating surface 192 has a first surface normal 193. The second separating surface 194 has a second surface normal 195. The third separating surface 196 has a third surface normal 197, see also FIGS. 2 and 3.

Figure 2:
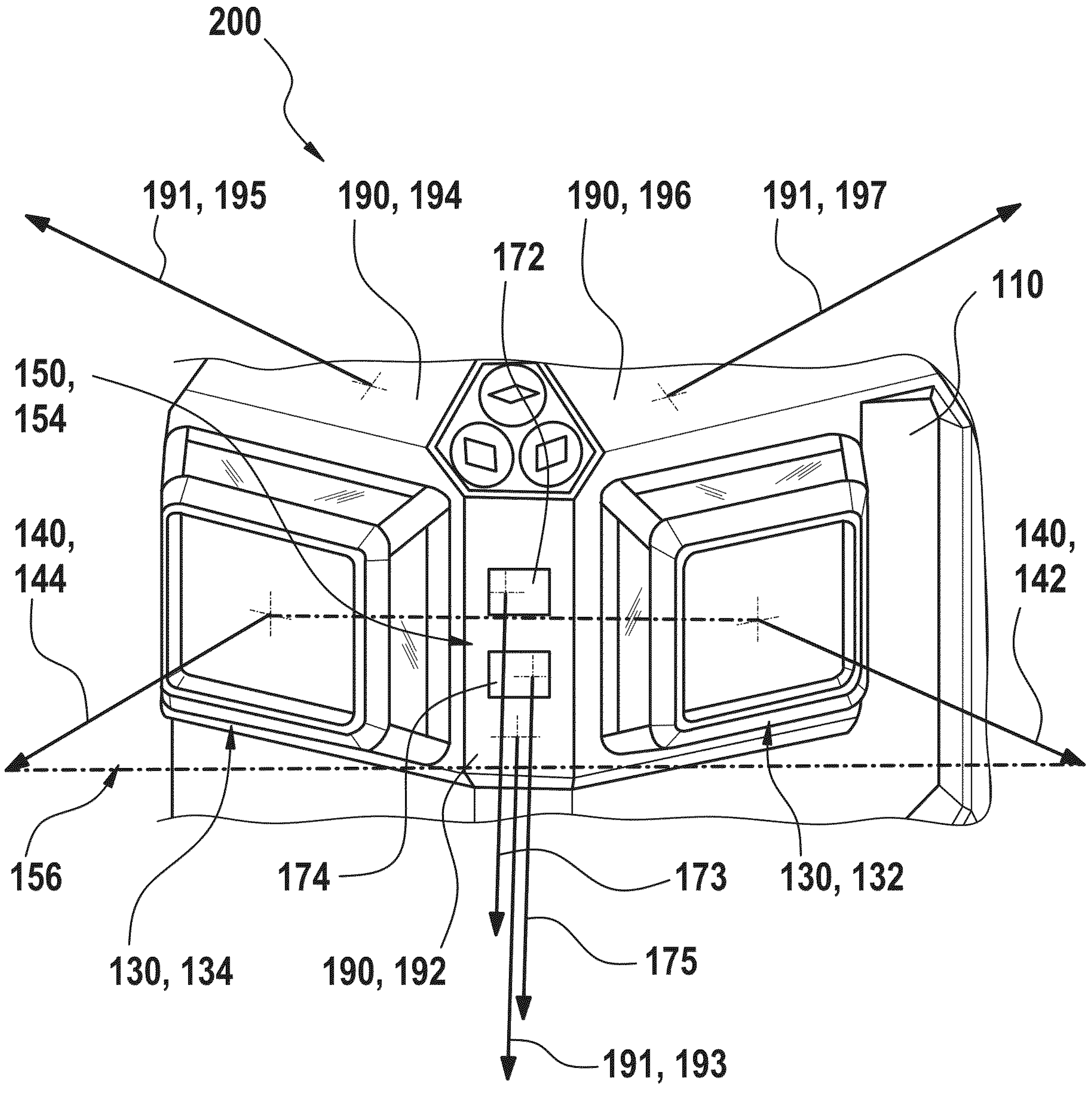
FIG. 2 a first section of a perspective view of the laser leveling device.

FIG. 2 shows a first section 200 of a perspective view of the laser leveling device 100. The first surface normal 142 of the first outlet dome 132 spans a first plane 156 with the second surface normal 144 of the second outlet dome 134. The second operating unit 154 is arranged relative to the first plane 156. Here, the second operating unit 154 is arranged transversely, in particular perpendicularly, to the first plane 156 on the housing 110. The second operating unit 154 comprises the two operating elements 172, 174. A first operating element 172 of the second operating unit 154 is configured to activate a communication link via Bluetooth. A second operating element 174 of the second operating unit 154 is configured to activate lighting. For example, the two operating elements 172, 174 of the second operating unit are formed slightly curved with a square outer contour. Each of the operating elements 172, 174 of the second operating unit 154 has a surface normal 173, 175. The surface normals 173, 175 of the second operating unit 154 are arranged on the housing 110 relative to the first plane 156. Here, the two surface normals 173, 175 are each parallel to the first plane 156. The surface normal 193 of the first separating surface 192 is here parallel to the first plane 156. The second operating unit 154 having the two operating elements 172, 174 is arranged on the first separating surface 192. Here, the first separating surface 192 is arranged between the first outlet dome 132 and the second outlet dome 134. Furthermore, the first operating element 172 of the second operating unit 154 and the second operating element 174 of the second operating unit 154 are arranged between the first outlet dome 132 and the second outlet dome 134.

Figure 3:
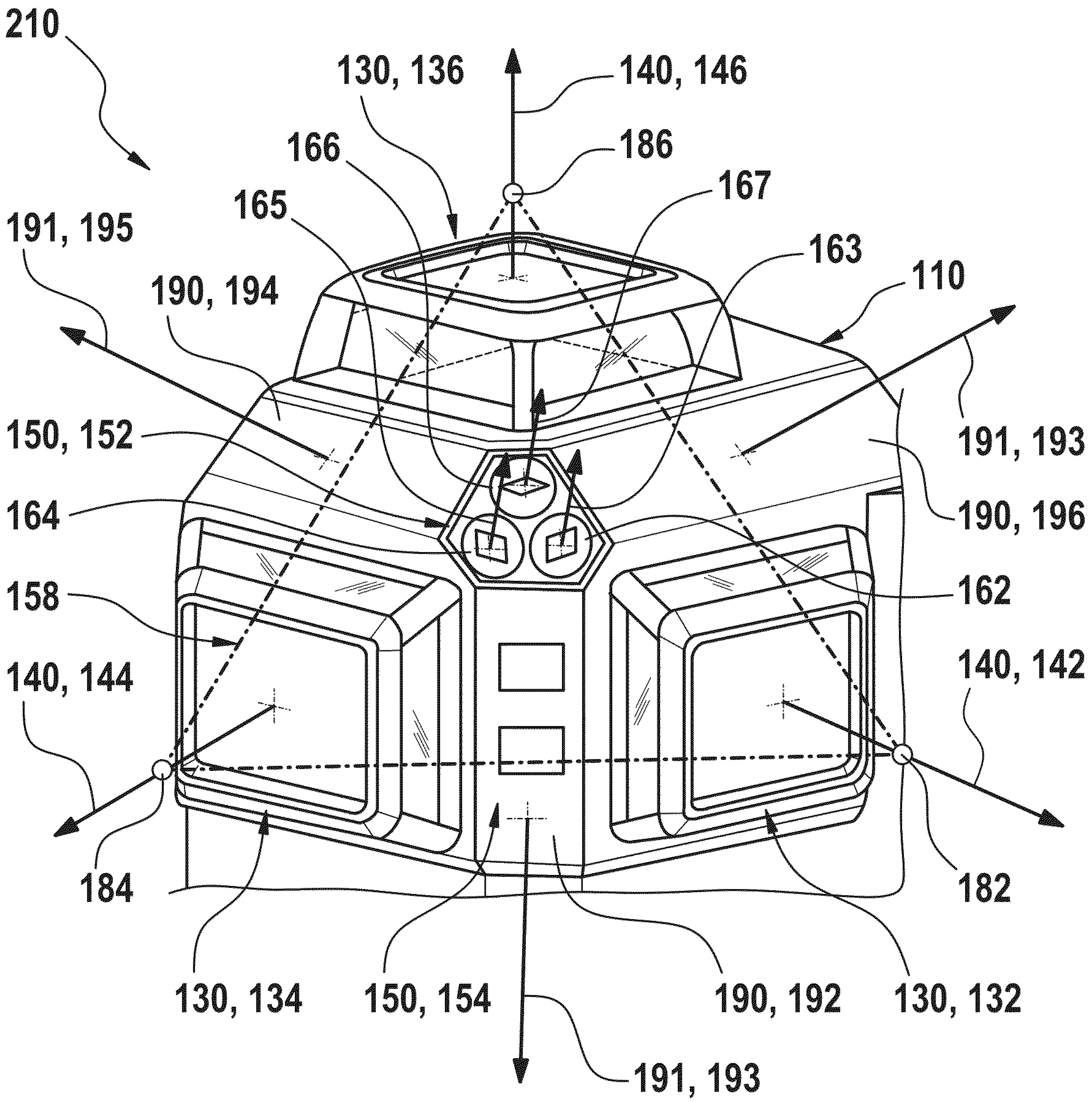
FIG. 3 a second section of the perspective view of the laser leveling device.

FIG. 3 shows a second section 210 of the perspective view of the laser leveling device 100. The first operating unit 152 has a hexagonal outer contour, by way of example, herein. The three operating elements 162, 164, 166 of the first operating unit 152 are each configured here to be flat with a pentagonal outer contour, for example. The first operating unit 152 is arranged between the three outlet domes 130. Each of the operating elements 162, 164, 166 of the first operating unit 152 has an operating surface. The operating surfaces of the operating elements 162, 164, 166 of the first operating unit each have a surface normal 163, 165, 167. Thus, the first operating element 162 of the first operating unit 152 has a first surface normal 163. The second operating element 164 of the first operating unit 152 has a second surface normal 165. The third operating element 166 of the first operating unit 152 has a third surface normal 167. The surface normals 163, 165, 167 of the operating surfaces of the first operating unit 152 are each perpendicular to the operating interface. One point 182, 184, 186 on each of the surface normals 142, 144, 146 of the outlet domes 130 span a second plane 158. The second plane 158 is arranged between the three surface normals 142, 144, 146 of the outlet domes 130. The second plane 158 is triangular, exemplarily being an equilateral triangle here. The first operating unit 152 abuts the three separating surfaces 192, 194, 196. The first operating unit 152 is arranged on the housing 110 relative to the second plane 158. Here, the first operating unit 152 lies, by way of example, on the second plane 158, such that the first operating unit 152 is parallel to the second plane 158. The surface normals 163, 165, 167 of the operating elements 162, 164, 166 of the first operating unit 152 are each perpendicular to the second plane 158.

The three operating elements 162, 164, 166 of the first operating unit 152 are each associated with one of the line projection devices 122, 124, 126. Thus, each of the three operating elements 162, 164, 166 activates one of the laser modules of the line projection devices 122, 124, 126. For example, the first operating element 162 of the first operating unit 152 activates the first line projection device 122. The first operating element 162 of the first operating unit 152 is arranged towards the first outlet dome 132. The second operating element 164 of the first operating unit 152 activates the second line projection device 124. The second operating element 164 of the first operating unit 152 is arranged towards the second outlet dome 134. The third operating element 166 of the first operating unit 152 activates the third line projection device 126. The third operating element 162 of the first operating unit 152 is arranged towards the third outlet dome 136. The three operating elements 162, 164, 166 of the first operating unit 152 are arranged between the three outlet domes 132, 134, 136, such that the user can directly recognize which of the line projection devices 122, 124, 126 is activated by means of the respective operating element 162, 164, 166. A distance between the respective surface normals 163, 165, 167 of the operating elements 162, 164, 166 of the first operating unit 152 and the respective surface normals 142, 144, 146 of the outlet dome 132, 134, 136 is minimal in each case. Two of the three operating elements 162, 164, 166 of the first operating unit each abut one of the separating surfaces 192, 194, 196. Thus, the first operating element 162 and the second operating element 164 of the first operating unit 152 abut the first separating surface 192. The second operating element 164 and the third operating element 166 of the first operating unit 152 abut the second separating surface 194.

The third operating element 166 and the first operating element 162 of the first operating unit 152 abut the third separating surface 196.

The invention claimed is:

1. A laser leveling device comprising:

at least two line projection devices;

a housing comprising at least two outlet domes, each of which is associated with one of the at least two line projection devices; and an operating unit configured for operating the laser leveling device, the operating unit being arranged between the at least two outlet domes and comprising at least one operating element arranged between the at least two outlet domes, wherein:

each of the at least two outlet domes has a surface normal, and the operating unit is arranged on the housing relative to a plane spanned by surface normals of two outlet domes of the at least two outlet domes, and the operating element has an operating element surface normal that is arranged relative to the plane spanned by the surface normals of the two outlet domes.

2. The laser leveling device according to claim 1, wherein the housing comprises at least one separating surface arranged at least in sections between the at least two outlet domes.

3. The laser leveling device according to claim 2, wherein the separating surface has a separating surface surface normal that lies on the plane spanned by the surface normals of the at least two outlet domes (130).

4. The laser leveling device according to claim 2, wherein the operating unit comprises at least one operating element arranged on the separating surface.

5. The laser leveling device according to claim 1, wherein:

the at least two line projection devices comprises three line projection devices, the at least two outlet domes comprises three outlet domes, and the operating unit is arranged at least partially between the three outlet domes.

6. The laser leveling device according to claim 5, wherein the operating unit comprises at least one operating surface arranged at least partially on a plane spanned by the surface normal of the three outlet domes.

7. The laser leveling device according to claim 5, wherein the operating unit comprises three operating elements, each of which is associated with one line projection device of the three line projection devices.

* * * * *